Nov. 27, 1923.
A. E. IMLER
TRACTOR HITCH
Filed Jan. 16, 1922
1,475,390
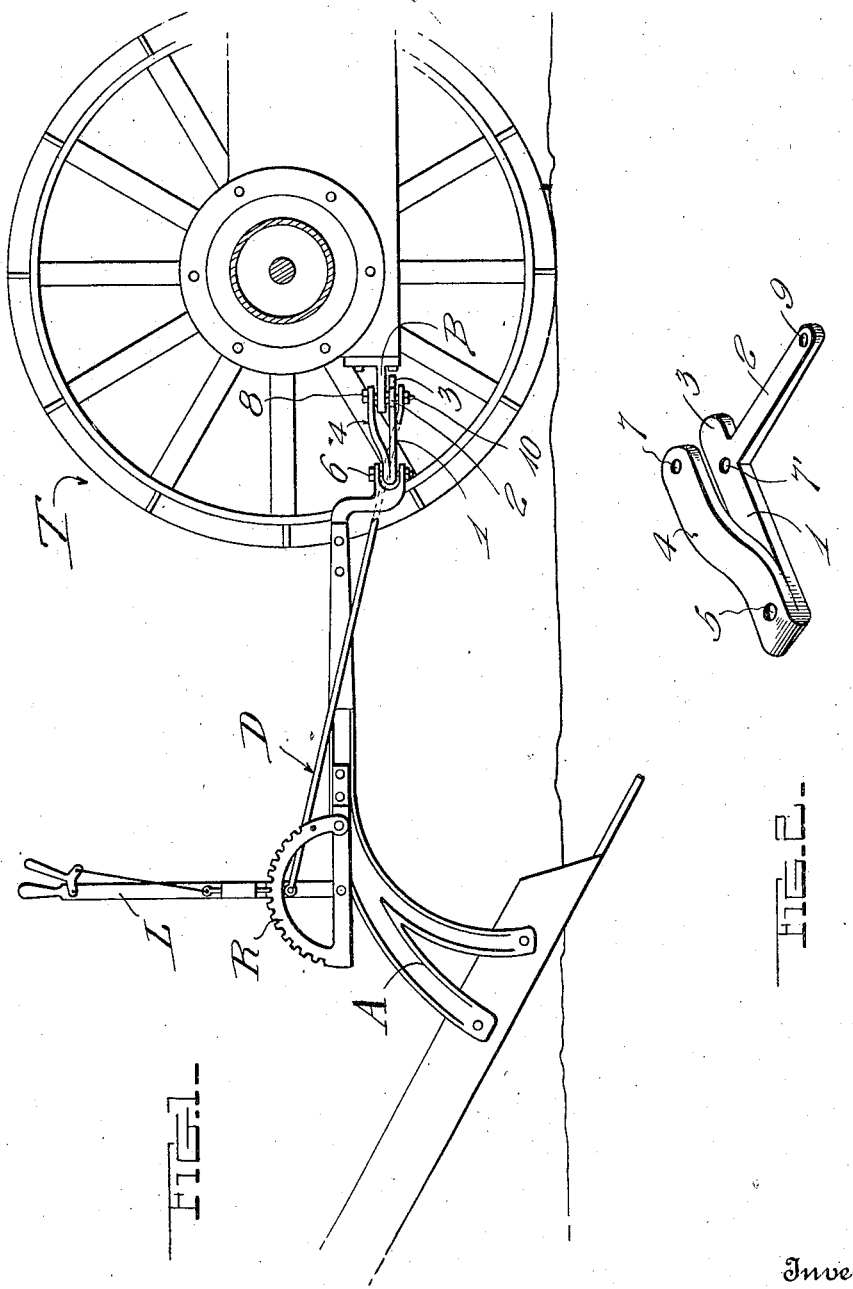
Witness
O. R. Pince
Inventor
Albert E. Imler
By H. A. Willson & Co.
Attorneys Patented Nov. 27, 1923.

1,475,390

UNITED STATES PATENT OFFICE.

ALBERT E. IMLER, OF KALKASKA, MICHIGAN.

TRACTOR HITCH.

Application filed January 16, 1922. Serial No. 529,723.

*To all whom it may concern:*

Be it known that I, ALBERT E. IMLER, a citizen of the United States, residing at Kalkaska, in the county of Kalkaska and State of Michigan, have invented certain new and useful Improvements in Tractor Hitches; and I do declare the following to be a full, clear, and exact description of the invention, such as will enable others skilled in the art to which it appertains to make and use the same.

This invention relates to an improved tractor hitch for use in connecting an agricultural implement such as a potato digger, plow or any other similar implement with a tractor so that the implement may be drawn across a field by the tractor.

One object of the invention is to provide a hitch which is so constructed that it may have a bell crank construction and be pivotally connected with the tractor for swinging movement in a horizontal plane but be held against vertical movement.

Another object of the invention is to so construct this hitch that it may have a longitudinally extending arm connected with the tractor and agricultural implement and have its transversely extending arm engaged by a draw-rod leading from a latch lever carried by the agricultural implement thus permitting the bell crank to be turned to cause the implement to be drawn across a field in the proper position behind the tractor.

Another object of the invention is to so construct this hitch that it may be formed from a single piece of metal stamped from heavy sheet metal and have its longitudinally extending arm bent back upon itself to provide upper and lower leaves between which a bracket or draw-bar of the tractor may be secured.

This invention is illustrated in the accompanying drawings, wherein:

Figure 1 is a view showing portions of a tractor and farming implement in side elevation and connected by means of the improved hitch.

Figure 2 is a perspective view of the bell crank hitch.

This improved hitch is to be used for connecting an agricultural implement with a tractor. A portion of the rear end of the tractor has been shown and indicated in general by the letter T. This tractor is provided with the usual bracket B at its rear end for engagement with the hitch and the agricultural implement which is indicated in general by the letter A is provided with a tongue terminating in a clevis. A latch lever L is pivotally connected with a rack R carried by the tongue of the agricultural implement and this latch lever is provided with a draw-rod D which extends forwardly at one side of the tongue. The hitch which is shown in Fig. 2 and shown applied in Fig. 1 is formed from heavy sheet metal and will be stamped in a single piece. This hitch is of a bell crank construction and is provided with a longitudinally extending arm 1 and a side arm 2 which extends transversely of the arm 1 and is positioned in spaced relation to the forward end of the arm 1 thus providing an end extension constituting a shield 3 which is to extend beneath the bracket B and serves to hold the hitch against vertical tilting movement through engagement with the underface of this bracket B. This arm 1 which is to extend longitudinally between the tractor and agricultural implement is doubled intermediate its length to provide upper and lower leaves and the upper leaf 4 is bent upwardly to extend in spaced relation to the lower leaf. An opening 5 is provided so that a bolt or pin 6 carried by the clevis C may extend through the rear end portion of the longitudinally extending bar of this bell crank hitch and connect the longitudinally extending bar with the forward end of the tongue or draft beam of the agricultural implement. An opening 7 is formed in the free end portion of the leaf 4 and is positioned above an opening 7' formed in the longitudinally extending bar opposite the side arm 2. The pivot pin or bolt 8 which serves to connect the bell crank hitch with the bracket of the tractor extends through these openings 7 and 7' and through the bracket which extends between the upper and lower leaves of the longitudinally extending arm as shown in Fig. 1. From an inspection of Fig. 1, it will be readily seen that when the securing bolt 8 is in place, the bell crank hitch will be connected with the bracket of the tractor for horizontal swinging movement and the shield portion 3 of the longitudinally extending arm or bar of the bell crank will serve to engage the underface of the bracket and prevent tilting movement of the hitch.

The side arm 2 is provided at its outer end with an opening 9 so that a securing bolt 10 may be passed through the draw rod D and side arm 2 thus loosely connecting the draw rod with the side arm. With the hitch pivotally connected with the bracket of the tractor and having its longitudinally extending arm connected with the clevis of the agricultural implement, and its side arm 2 connected with the draw bar which extends from the latch lever, the agricultural implement will be connected with the tractor and as the tractor moves across a field, the agricultural implement will be drawn across the field behind it. If it is found that the agricultural implement is not moving in a straight line across the field, or if the agricultural machine is being used for removing potatoes planted in hills which do not extend in a straight line and it is necessary to have the agricultural machine move slightly out of the direct line in order to follow the hill, the latch lever can be moved with respect to the rack and movement will be imparted to the bell crank hitch through the medium of the draw bar D thus swinging the hitch upon the pivot pin or bolt 8 and causing the agricultural machine to move in the desired direction. There has thus been provided a hitch so constructed that an agricultural implement may be secured behind a tractor and caused to move across a field in a desired manner when the tractor is in motion. It will also be seen that this hitch is so constructed that it will be very strong and durable and can be cheaply produced.

I claim:

1. A tractor hitch comprising a bell crank structure for pivotal connection with a tractor for swinging movement in a horizontal plane with one arm extending longitudinally from the tractor and its other arm extending transversely of the tractor, the longitudinally extending arm having its free end adapted for connection with an implement and the transversely extending arm having its free end portion adapted for connection with adjusting means for holding the bell crank structure in a desired position, the longitudinally extending arm having a fastener receiving opening in alinement with the transversely extending arm and having its forward end portion extending beyond the transverse arm to provide an extension for extending beneath a portion of the tractor and holding the bell crank structure against vertical tilting movement.

2. A tractor hitch comprising a bell crank structure having a longitudinally extending arm and a transversely extending side arm in spaced relation to the forward end of the longitudinally extending arm, the longitudinally extending arm being provided with fastener receiving openings at the junction of the arms and adjacent its rear end and side arm having its free end portion provided with a fastener receiving opening.

3. A tractor hitch comprising a bell crank structure having a longitudinally extending arm and a transversely extending arm in spaced relation to the end of the longitudinally extending arm, the longitudinally extending arm being bent back upon itself to provide upper and lower leaves and the upper leaf being bent to extend in spaced relation to the lower leaf and having an opening above an opening in the lower leaf opposite the transversely extending arm, the outer end portion of the transversely extending arm having a fastener receiving opening and the doubled portion of the longitudinally extending arm having a fastener receiving opening.

In testimony whereof I have hereunto set my hand.

ALBERT E. IMLER.